United States Patent [19]

Dunn

[11] Patent Number: 5,239,905

[45] Date of Patent: Aug. 31, 1993

[54] MITER TABLE MOLDING POSITIONING APPARATUS

[76] Inventor: Gail E. Dunn, 808 Moss Chapel Rd., Hartselle, Ala. 35640

[21] Appl. No.: 962,929

[22] Filed: Oct. 19, 1992

[51] Int. Cl.$^5$ .............................................. B26D 7/02
[52] U.S. Cl. .......................................... 83/459; 83/452; 83/464; 83/466; 269/126
[58] Field of Search ................. 83/452, 459, 464, 466; 269/88, 95, 100, 126, 254 CS, 240

[56] References Cited

U.S. PATENT DOCUMENTS

| | | | |
|---|---|---|---|
| 1,175,811 | 3/1916 | Ray | 83/466 X |
| 1,195,345 | 8/1916 | Ferney | 269/240 X |
| 1,435,595 | 11/1922 | Fegely et al. | 269/240 X |
| 1,745,379 | 2/1930 | Perry | 269/254 CS X |
| 4,226,152 | 10/1980 | Bies | 83/764 |
| 4,475,727 | 10/1984 | Goulter | 269/88 |
| 4,697,801 | 10/1987 | Wuerthele | 269/100 |
| 4,815,350 | 3/1989 | Faig | 83/464 X |

Primary Examiner—Frank T. Yost
Assistant Examiner—Raymond D. Woods
Attorney, Agent, or Firm—Leon Gilden

[57] ABSTRACT

An arrangement to position molding, and particularly crown molding, upon a miter table is arranged to include at least one positioning assembly having an adjustment rod threadedly directed parallel to and below the miter saw table, with an abutment plate mounted to a positioning rod that is arranged above and parallel to the adjuster rod, with the abutment plate arranged for engaging the molding for orienting the molding in a predetermined orientation relative to a saw blade of the associated miter table.

5 Claims, 4 Drawing Sheets

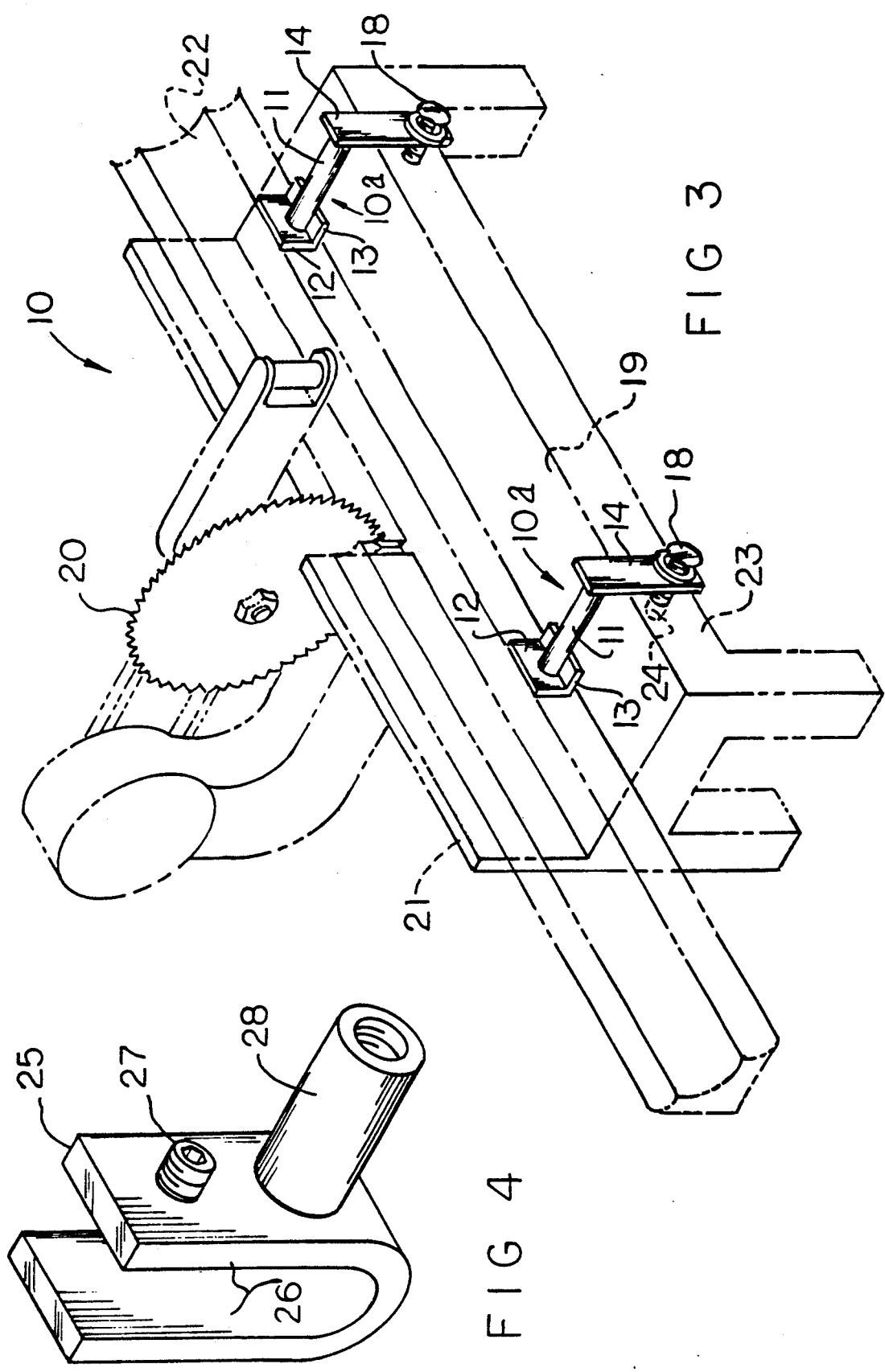

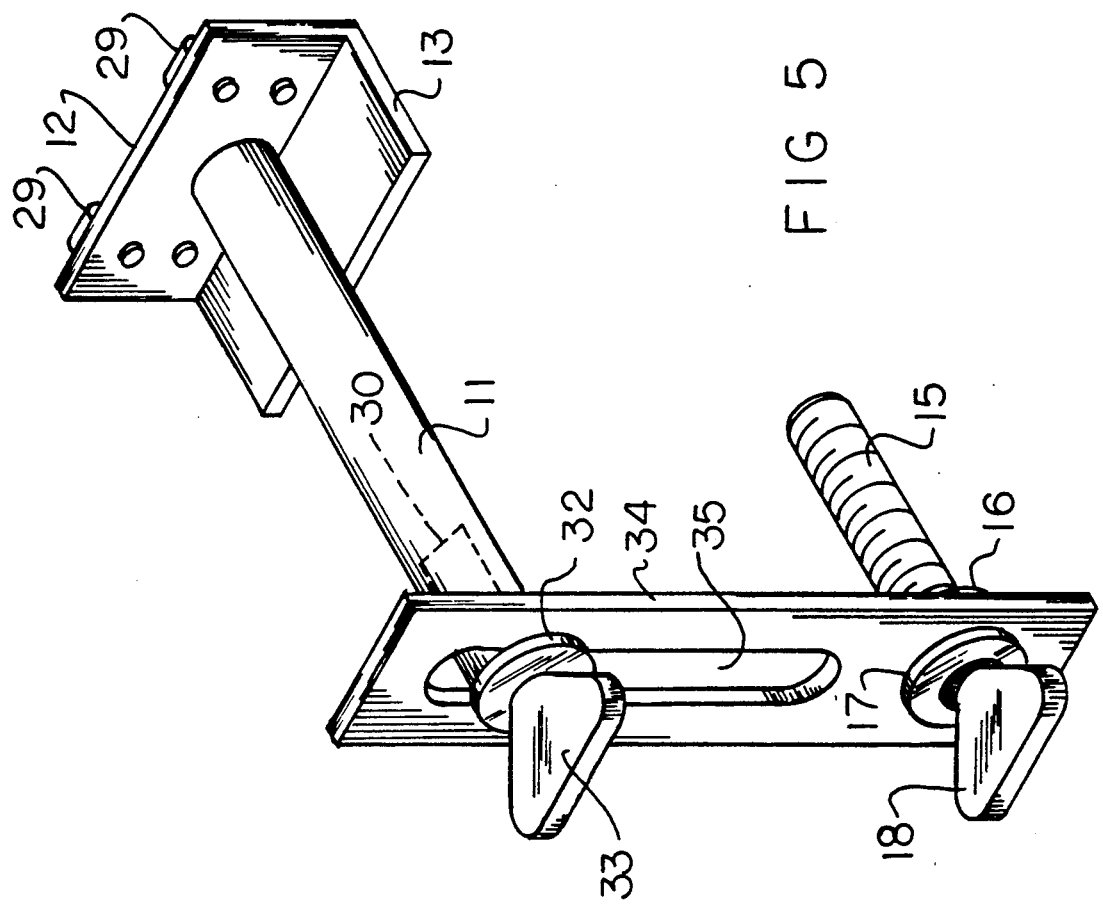
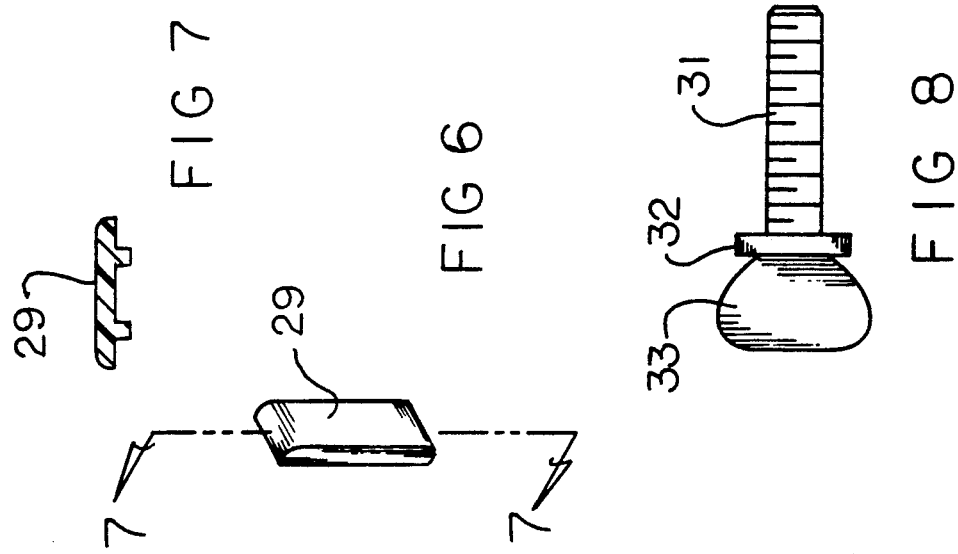

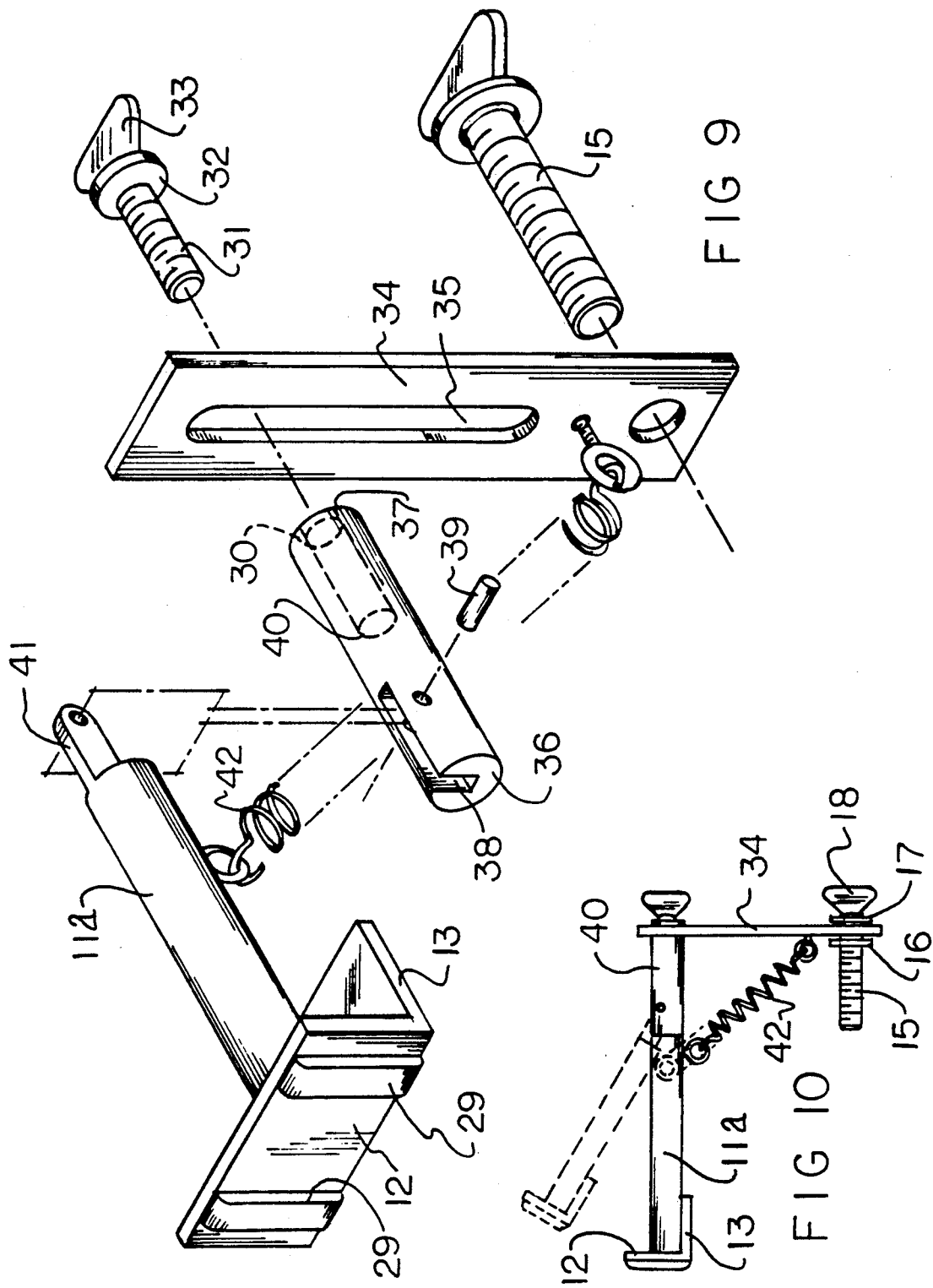

MITER TABLE MOLDING POSITIONING APPARATUS

BACKGROUND OF THE INVENTION

1. Field of the Invention

The fireld of invention relates to miter table apparatus, and more particularly pertains to a new and improved miter table molding positioning apparatus wherein the same is arranged to position a regularly configured crown molding and the like relative to a saw blade for severing of the molding.

2. Description of the Prior Art

Molding, and particularly ornate molding, is of various configurations and to provide for its repetitive and correct severing, its proper and repetitive positioning upon a modern table is required. The prior art has heretofore provided for a variety of miter type tables arranged for servering as indicated in U.S. Pat. Nos. 3,543,816; 4,412,468; and 4,798,113, as well as U.S. Pat. No. 4,226,152 to position work relative to a miter table.

The prior art has heretofore, however, failed to provide for the proper positioning of molding, particularly molding that is readily configured, by providing for an abutment surface relative to a miter table fence plate and in this respect, the present invention substantially fulfills this need.

SUMMARY OF THE INVENTION

In view of the foregoing disadvantages inherent in the known types of miter table apparatus now present in the prior art, the present invention provides a miter table molding positioning apparatus wherein the same is arranged to provide for an abutment surface between an abutment plate and a miter table fence to direct crown molding therebetween relative to a saw blade. As such, the general purpose of the present invention, which will be described subsequently in greater detail, is to provide a new and improved miter table molding positioning apparatus which has all the advantages of the prior art miter table apparatus and none of the disadvantages.

To attain this, the present invention provides an arrangement to position molding, and particularly crown molding, upon a miter table to include at least one positioning assembly having an adjustment rod threadedly directed parallel to and below the miter saw table, with an abutment plate mounted to a positioning rod that is arranged above and parallel to the adjuster rod, with the abutment plate arranged for engaging the molding for orienting the molding in a predetermined orientation relative to a saw blade of the associated miter table.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public genrally, and especially the scientists, engineers and practitioners in the art who are not familiar with patent or legal terms or phraselogy, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved miter table molding positioning apparatus which has all the advantages of the prior art miter table apparatus and none of the disadvantages.

It is another object of the present invention to provide a new and improved miter table molding positioning apparatus which may be easily and efficiently manufactured and marketed.

It is a further object of the present invention to provide a new and improved miter table molding positioning apparatus which is of a durable and reliable construction.

An even further object of the present invention is to provide a new and improved miter table molding positioning apparatus which is susceptible of a low cost of manufacture with regard to both materials and labor, and which accordingly is then susceptible of low prices of sale to the consuming public, thereby making such miter table molding positioning apparatus economically available to the buying public.

Still yet another object of the present invention is to provide a new and improved miter table molding positioning apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an isometric illustration of the invention in an assembled configuration.

FIG. 4 is an isometric illustration of a miter table skirt clamp arrangement for threadedly receiving the adjuster rod of the positioning assembly.

3

Figure 1:
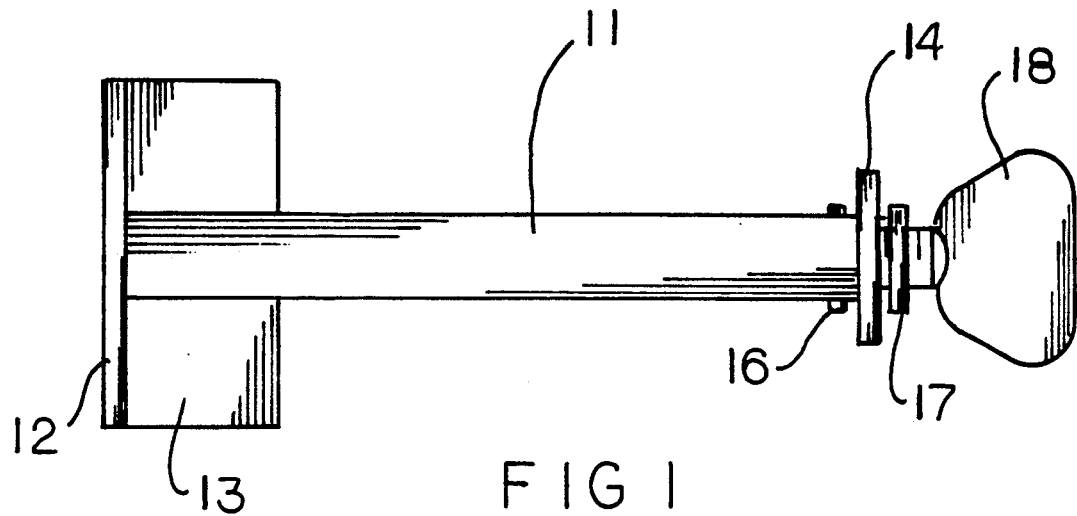
FIG. 1 is an orthographic top view of a positioning assembly of the invention.

FIG. 5 is an isometric illustration in use of a modified support plate of the invention.

FIG. 6 is an isometric illustration of a resilient strip member for use by the invention.

FIG. 7 is an orthographic view, taken along the lines 7—7 of FIG. 6 in the direction indicated by the arrows.

FIG. 8 is an orthographic side view of a clamp rod structure as utilized by the invention, as set forth in FIG. 5.

FIG. 9 is an isometric illustration of a modified aspect of the invention.

FIG. 10 is an orthographic side view of the modified aspect of the invention.

DESCRIPTION OF THE PREFERRED EMBODIMENT

With reference now to the drawings, and in particular to FIGS. 1 to 10 thereof, a new and improved miter table molding positioning apparatus embodying the principles and concepts of the present invention and generally designated by the reference numeral 10 will be described.

Figure 2:
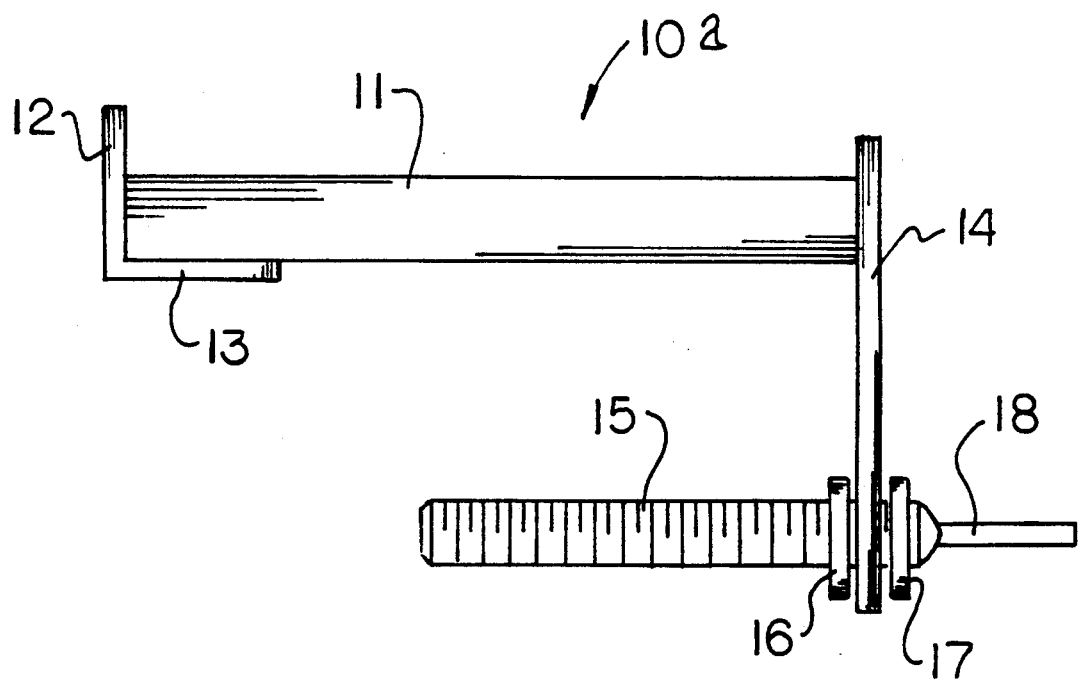
FIG. 2 is an orthographic side view of a positioning assembly as utilized by the invention.

More specifically, the miter molding positioning apparatus 10 of the instant invention essentially comprises a plurality of positioning assemblies 10a of a type as indicated in FIGS. 1 and 2, wherein at least one of said assemblies are mounted relative to a saw table 19, or more specifically to a saw table skirt 23. The saw table includes a fence plate 21 projecting orthogonally and upwardly relative to the saw table, with the fence plate 21 having a slot to receive a saw 20 therethrough to sever a molding member 22 directed along the fence plate 21 and the saw table 19.

Each positioning assembly 10a includes a positioning rod 11 orthogonally mounted at its first end to a support plate 14 and to a second end of a positioning rod 11 to an abutment plate 12 that is orthogonally mounted to the positioning rod second end. The abutment plate 12 includes a slide plate 13 orthogonally mounted to a lower distal end of the abutment plate, wherein the slide plate 13 is arranged for sliding communication on a top surface of the saw table 19, in a manner as indicated in FIG. 3. An externally threaded adjuster rod 15 is orthogonally directed through the support plate 14 below the positioning rod 11, with the adjuster rod 15 directed into the saw table skirt. The adjuster rod 15 includes first and second collar discs 16 and 17 mounted on opposed sides of the support plate 14 to position rotatably the adjuster rod relative to the support plate, whereupon threaded rotation of rod 15 by handle 18 and directing of the adjuster rod 15 into the saw table skirt threaded bore 24 (see FIG. 3 for example) reciprocates the abutment plate 12 relative to the saw table fence plate 21 to properly orient the molding member 22.

FIG. 4 illustrates the use of an optional U-shaped skirt clamp 25 having spaced parallel clamp plates 26 to receive the saw table skirt 23 therebetween, whereupon a clamp screw 27 is directed through one of the clamp plates 26 to secure the U-shaped skirt clamp 25 relative to the saw table skirt. An internally threaded boss 28 orthogonally mounted to one of the clamp plates 26 projecting exteriorly thereof is arranged to receive the adjuster rod 15 therewithin, and in this manner avoid the use of a saw table skirt threaded bore 24.

The FIG. 5 and the FIG. 9 indicate the use of resilient strip members 29 arranged for selective mounting to the abutment plate 12 to provide for a frictional surface to engage the molding member 22 to more effectively maintain its orientation between the saw table fence plate 21 and the saw table 19. Further, a positioning rod threaded bore 30 is provided to receive an externally threaded clamp rod 31 having a clamp rod handle 33 therethrough that in turn includes a clamp rod collar 32 for abutment to an exterior surface of a modified support plate 34 having a slot 35 orthogonally oriented between the positioning rod 11 and the adjuster rod 15.

In the organization of FIG. 9, in lieu of the positioning rod, a positioning rod extension leg 40 is provided having a positioning rod internally threaded bore 30 directed into the positioning rod's first end 37. A positioning rod extension second end 36 includes a positioning rod slot 38 having a pivot axle 39 orthogonally directed through the slot 38. The slot 38 is arranged to originate coaxially of the positioning rod coaxially of the positioning rod extension leg 40 projecting through a side wall thereof to receive a positioning rod pivot plate 41 of a modified positioning rod 12, with the positioning rod pivot plate 41 pivotally mounted relative to the positioning rod extension leg 40 and biased into a longitudinally aligned relationship therewith by a spring member 42 directed between the positioning rod 11a and the modified support plate 34. In this manner, the modified positioning rod 11a may be lifted to permit ease of positioning of a molding member 22 between the abutment plate 12 and the fence 21.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A miter table molding positioning apparatus, comprising,
 a miter table having a saw table, and the saw table having a fence plate orthogonally mounted to the saw table extending upwardly thereof.
 at least one saw table skirt projecting downwardly relative to the saw table in a spaced relationship relative to the fence plate,
 the fence plate having a fence plate slot and a saw received within the fence plate slot,
 at least one positioning assembly mounted to the saw table skirt, with the positioning assembly including a support plate,
 an adjuster rod threadedly received within the saw table skirt, with the adjuster rod orthogonally oriented to and rotatably received through the support plate, a positioning rod spaced from and parallel to the adjuster rod, with the positioning rod orthogonally oriented to and fixedly mounted to the support plate and the positioning rod including an abutment plate fixedly and orthogonally mounted to the positioning rod, with the abutment plate parallel to the support plate spaced from the support plate, the abutment plate arranged in a spaced relationship to the fence plate to position a molding therebetween, and the abutment plate including a slide plate, with the slide plate fixedly and orthogonally mounted to a lower edge of the abutment plate and the slide plate slidably mounted on the saw table.

2. An apparatus as set forth in claim 1 wherein the positioning rod includes a positioning rod pivot plate, and the positioning rod includes a positioning rod extension leg, the positioning rod extension leg having a first end arranged for mounting to the support plate, and a second end, with the second end having a slot, the slot diametrically aligned with the positioning rod extension leg having a pivot axle directed therethrough, and the pivot axle directed through the positioning rod pivot plate pivotally mounting the positioning rod relative to the positioning rod extension leg, and a support plate slot directed through the support plate, and the positioning rod extension leg having an extension leg internally threaded bore, and a positioning rod externally threaded clamp rod directed through the support plate slot received within the positioning rod extension leg internally threaded bore to selectively secure the positioning rod extension leg along the support plate slot.

3. An apparatus as set forth in claim 2 including a spring member mounted to the positioning rod and to the support plate between the support plate slot and the adjuster rod to bias the positioning rod in longitudinal alignment relative to the positioning rod extension leg.

4. An apparatus as set forth in claim 3 wherein the adjuster rod includes a first collar disc and a second collar disc, with the support plate positioned between the first collar disc and the second collar disc to rotatably position the adjuster rod relative to the support plate.

5. An apparatus as set forth in claim 4 including a plurality of resilient strip members arranged for selective mounting to the abutment plate.

* * * * *